(12) United States Patent
Matsuo et al.

(10) Patent No.: US 11,329,405 B2
(45) Date of Patent: May 10, 2022

(54) TAPE-SHAPED CONTACT MEMBER AND METHOD FOR MANUFACTURING SAME

(71) Applicant: TANAKA KIKINZOKU KOGYO K.K., Tokyo (JP)

(72) Inventors: Hiroshi Matsuo, Hiratsuka (JP); Ryoe Wada, Hiratsuka (JP)

(73) Assignee: TANAKA KIKINZOKU KOGYO K.K., Tokyo (JP)

(*) Notice: Subject to any disclaimer, the term of this patent is extended or adjusted under 35 U.S.C. 154(b) by 364 days.

(21) Appl. No.: 16/346,820

(22) PCT Filed: Dec. 18, 2017

(86) PCT No.: PCT/JP2017/045301
§ 371 (c)(1),
(2) Date: May 1, 2019

(87) PCT Pub. No.: WO2018/117021
PCT Pub. Date: Jun. 28, 2018

(65) Prior Publication Data
US 2019/0280402 A1    Sep. 12, 2019

(30) Foreign Application Priority Data

Dec. 19, 2016 (JP) .............................. JP2016-245084

(51) Int. Cl.
*H01R 4/58* (2006.01)
*H01H 49/00* (2006.01)
*H01R 43/16* (2006.01)
(Continued)

(52) U.S. Cl.
CPC .................. *H01R 4/58* (2013.01); *H01H 1/06* (2013.01); *H01H 11/04* (2013.01); *H01H 49/00* (2013.01);
(Continued)

(58) Field of Classification Search
CPC . H01R 4/58; H01R 43/16; H01H 1/06; H01H 11/04; H01H 49/00; H01H 50/54;
(Continued)

(56) References Cited

U.S. PATENT DOCUMENTS 4,576,659 A    3/1986 Lewis et al.
5,796,065 A    8/1998 Fujiyoshi et al.
(Continued)

FOREIGN PATENT DOCUMENTS

EP    2 554 205 A    2/2013
EP    2 738 890 A1    6/2014
(Continued)

OTHER PUBLICATIONS

Extended European Search Report dated Oct. 28, 2019 for corresponding Application No. 17883571.6 (10 pages).
(Continued)

*Primary Examiner* — Mohamad A Musleh
(74) *Attorney, Agent, or Firm* — Foley & Lardner LLP (57) ABSTRACT

Provided is a tape-shaped contact member including a tape-shaped contact material. At least one wire-shaped brazing material is bonded to the tape-shaped contact material, at least one projection including the brazing material and protruding from a surface of the contact material is formed in a cross-sectional shape, a diffusion region containing a metal component forming the brazing material is formed along an interface with the brazing material inside the contact material, and the diffusion region has a thickness of 2 μm or more and 10 μm or less. A chip-shaped contact component can be obtained by cutting the tape-shaped contact member to an arbitrary length. The present contact component is useful as a constituent member for a switching electrical contact, and capable of adapting to height reduction of the electrical contact. The present invention can also contribute to reduction of occurrence of poor bonding.

20 Claims, 8 Drawing Sheets

(51) Int. Cl.
*H01H 50/54* (2006.01)
*H01H 1/06* (2006.01)
*H01H 11/04* (2006.01)
*H01H 1/023* (2006.01)

(52) U.S. Cl.
CPC ............. *H01H 50/54* (2013.01); *H01R 43/16* (2013.01); *H01H 1/023* (2013.01)

(58) Field of Classification Search
CPC .... H01H 1/023; H01H 1/0231; B23K 3/0623; B23K 2101/38; B23K 1/0008
See application file for complete search history.

(56) References Cited

U.S. PATENT DOCUMENTS

| | | |
|---|---|---|
| 2008/0087649 A1 | 4/2008 | Kasai et al. |
| 2013/0030380 A1 | 1/2013 | Abe et al. |
| 2014/0031764 A1 | 1/2014 | Abe et al. |

FOREIGN PATENT DOCUMENTS

| | | |
|---|---|---|
| JP | S51-121455 A | 10/1976 |
| JP | S56-24779 A | 3/1981 |
| JP | S62-271311 A | 11/1987 |
| JP | S64-7437 A | 1/1989 |
| JP | H03-246832 A | 11/1991 |
| JP | H10-163404 A | 6/1998 |
| JP | 4279645 B2 | 6/2009 |

OTHER PUBLICATIONS

International Searching Authority, "International Search Report," issued in connection with International Patent Application No. PCT/JP2017/045301, dated Feb. 27, 2018.

International Searching Authority, "Written Opinion," issued in connection with International Patent Application No. PCT/JP2017/045301, dated Feb. 27, 2018.

Extended European Search Report dated Oct. 23, 2019 for corresponding Application No. 17774011.5 (8 pages).

EXAMPLE 1

EXAMPLE 2

EXAMPLE 3

EXAMPLE 4

EXAMPLE 1

EXAMPLE 4

CONVENTIONAL EXAMPLE

TAPE-SHAPED CONTACT MEMBER AND METHOD FOR MANUFACTURING SAME

RELATED APPLICATIONS

The present application claims priority under 37 U.S.C. § 371 to International Patent Application No. PCT/JP2017/045301, filed Dec. 18, 2017, which claims priority to and the benefit of Japanese Patent Application No. 2016-245084, filed on Dec. 19, 2016. The contents of these applications are hereby incorporated by reference in their entireties.

TECHNICAL FIELD

The present invention relates to a tape-shaped contact member for forming a component of a switching electrical contact of a relay, a switch or the like. Specifically, the present invention relates to a tape-shaped contact member for supplying a chip-shaped contact component that is bonded to a terminal of a switching electrical contact, the tape-shaped contact member being capable of supplying a contact component which hardly suffers from poor contact while adapting to downsizing and height reduction.

BACKGROUND ART

Figure 8:
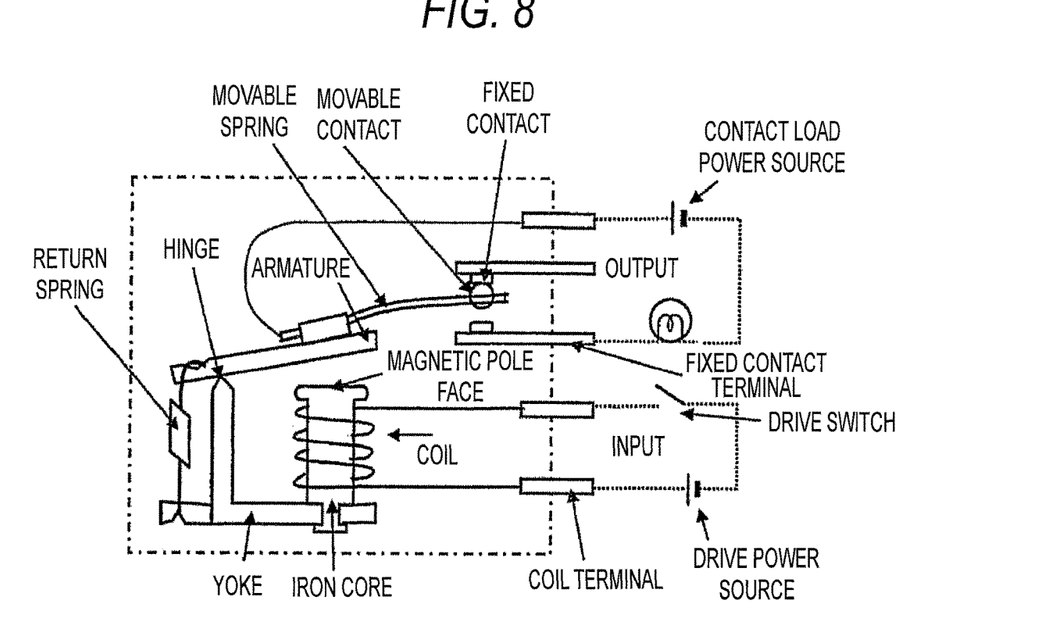
FIG. 8 illustrates a structure of a general relay that is a type of switching contact.
Figure 9:
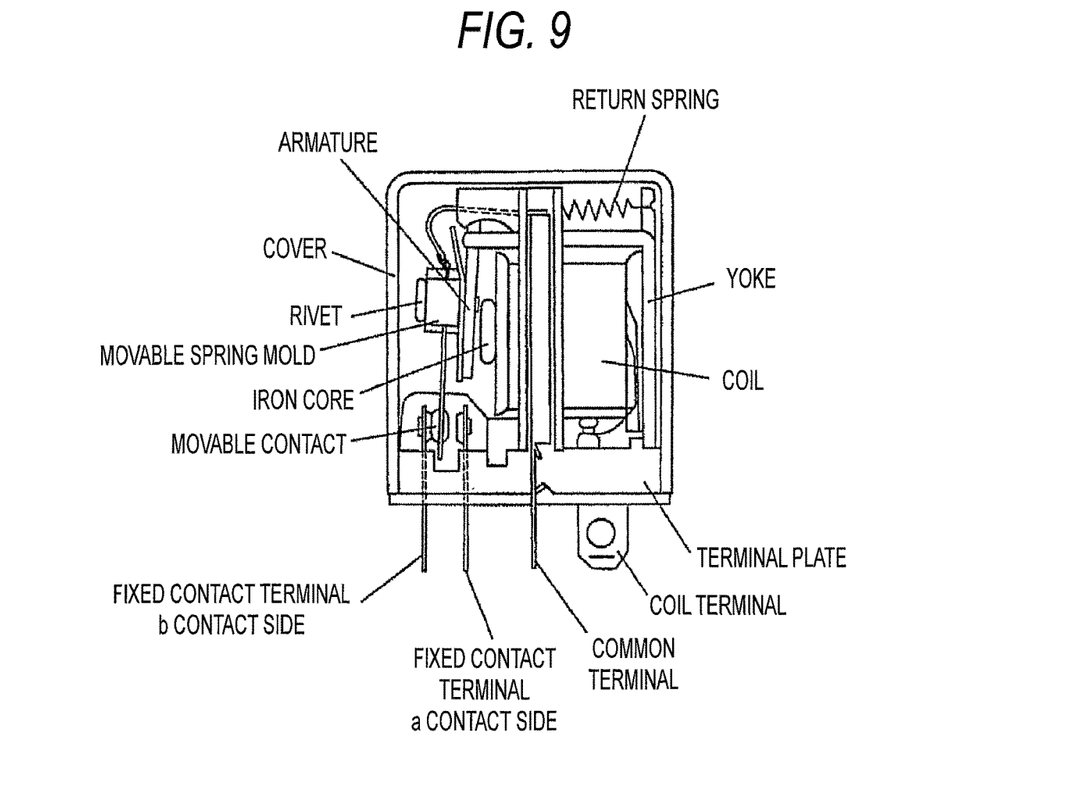
FIG. 9 illustrates a structure of a relay of flexure type.

Switching electrical contacts have been heretofore used as components of various relays and switches for electrical equipment such as automobile electric components, home electric appliances and OA equipment. FIG. 8 is a view illustrating a structure of a general relay. In addition, FIG. 9 is a view illustrating a structure of a relay of flexure type as one aspect of the relay. In a switching electrical contact, a contact component is bonded to a terminal (electrically conductive plate), and an electrical circuit is electrically switched by the contact component. As the contact component, a chip-shaped contact component to be welded and bonded to a terminal is known. Such a contact component is used in both a fixed contact and a movable contact in FIGS. 8 and 9.

Figure 10:
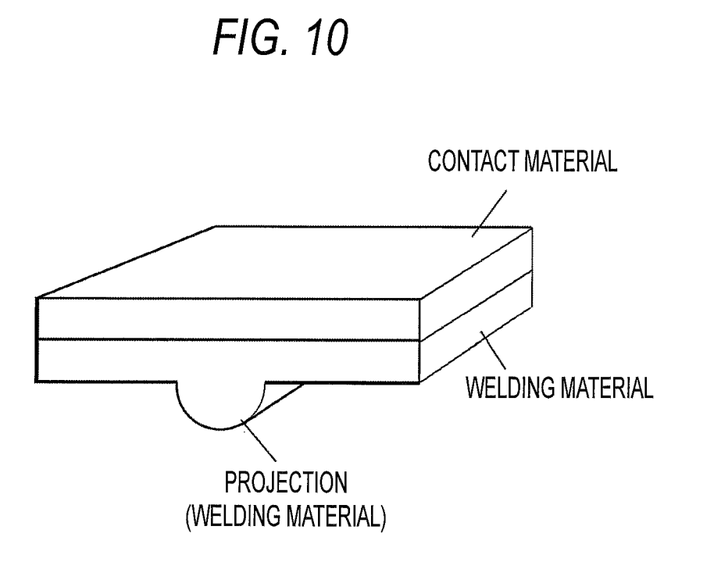
FIG. 10 illustrates a configuration of a contact component to which a conventional welding material with a projection is applied.

Examples of the chip-shaped contact component include contact components in which a welding material for bonding the contact component to a terminal is bonded to a contact material such as a silver alloy as in FIG. 10. In the contact component, the welding material includes a high-resistance metallic material such as a copper-nickel alloy, and an irregular projection is formed on a bonding surface. The contact component is bonded to a terminal by resistance welding using the projection of the welding material.

Figure 11:
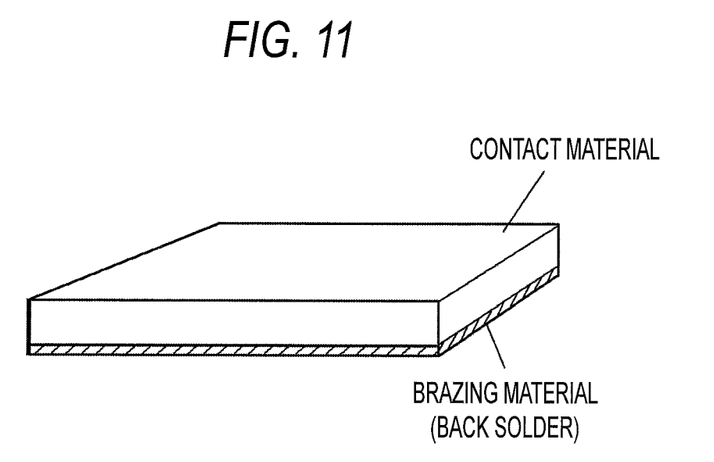
FIG. 11 illustrates a configuration of a contact component including conventional back solder.

In addition, as another form of the chip-shaped contact component, a contact component including a contact material and a thin brazing material layer (back solder) as in FIG. 11 is known. The contact component including back solder is bonded to a terminal by heating and melting a brazing material.

In manufacturing and use of a chip-shaped contact component as described above, a tape-shaped contact member is manufactured, and cut to an arbitrary length to manufacture a chip-shaped contact component, and the contact component is bonded to a terminal. Such a tape-shaped contact member is a long material having the same cross-sectional shape as in FIGS. 10 and 11, and is obtained by bonding to a tape-shaped contact material a tape-shaped welding material subjected to projection processing in advance, or a tape-shaped brazing material subjected to rolling processing in advance. Regarding such a tape-shaped contact member, for example, the applicant of the present application has developed and disclosed a combination of a projection and a brazing material as described in Patent Document 1.

RELATED ART DOCUMENT

Patent Document

Patent Document 1: JP 4279645 B2

SUMMARY OF THE INVENTION

Problems to be Solved by the Invention

Electrical contacts for on-vehicle relays in recent years have been strongly required to adapt to downsizing and capacity increase. Thus, the configuration of a chip-shaped contact component to be used for relays also needs to be improved in light of these requirements. However, the above-mentioned conventional contact components cannot sufficiently meet these requirements. That is, of the above-mentioned contact components, the former contact component including a welding material provided with a convex projection is obstructive to height reduction and downsizing of contact components because of the thickness of the welding material. In addition, in the contact component, the welding material having a thermal conductivity lower than that of the contact material hinders heat dissipation, and is therefore a source of concern to capacity increase of electrical contacts. Further, the welding material has high electric resistance, thus generates a large amount of heat when fed with electricity, and is therefore advantageous for resistance welding, but causes an increase in heat generation when used as a contact material, and is a source of concern to capacity increase of electrical contacts in this regard.

On the other hand, the latter contact component having back solder is bonded to a terminal with a thin brazing material layer, and therefore can be expected to adapt to height reduction. However, this type of contact component has the problem that at the time of bonding the contact component to a terminal, only a contact end portion is welded, resulting in destabilization of welding to the terminal, or a molten brazing material protrudes, so that the brazing material is deposited on the surface of a contact material or the terminal, resulting in occurrence of contact disorders. Thus, it is necessary to design and process the brazing material with sufficient consideration given to these problems.

In addition, the contact component having back solder is advantageous from the viewpoint of a bonding force because a contact material can be bonded to a terminal with the entire bonding surface. However, for reliable bonding free from defects and prevention of the protrusion of a brazing material, bonding work in a strictly horizontal state is required. It is difficult to achieve the above-mentioned strict design and processing of a brazing material layer and bonding conditions for a contact component that needs to be downsized. The contact component in Patent Document 1 by the applicant of the present application takes protrusion of a brazing material, etc. into consideration, but does not necessarily sufficiently meet more advanced requirements for downsizing.

The present invention has been made against the above-mentioned backgrounds, and provides a tape-shaped contact member for manufacturing a chip-shaped contact component for manufacturing a switching electrical contact, the chip-shaped contact component being capable of adapting to downsizing and height reduction, and having contact performance without suffering from poor bonding to a terminal etc. In the present invention, the configuration of such a contact component is clarified. In the present invention, a member formed in a chip shape in order to bond the member to a terminal etc. is referred to as a "contact component", and a tape-shaped material for manufacturing the chip-shaped contact component is referred to as a "contact member". In the contact component and the contact member, a contact material as a material to which a brazing material is bonded is referred to as a "contact material".

Means for Solving the Problems

For solving the problems described above, the present inventors conducted studies on improvement of the shape of a brazing material while avoiding application of the above-described conventional welding material. As a result, the present inventors decided to apply a protrusive (wire-shaped) brazing material, which is locally elevated on a bonding surface of a contact material, in place of a layered (tape-shaped) brazing material which covers the bonding surface of the contact material. That is, the present inventors decided to form a projection (protrusion) including a brazing material on the bonding surface of the contact material. The present inventors arrived at the present invention by finding that the various problems described above can be solved by optimizing the state of a bonding portion between the projection including a brazing material and the contact material in addition to changing the shape as described above.

That is, the present invention provides a tape-shaped contact member including a tape-shaped contact material. In the tape-shaped contact material, at least one wire-shaped brazing material is bonded to the tape-shaped contact material, at least one projection including the brazing material and protruding from a surface of the contact material is formed in a cross-sectional shape, a diffusion region containing a metal component forming the brazing material is formed along an interface with the brazing material inside the contact material, and the diffusion region has a thickness of 2 μm or more and 10 μm or less.

Figure 1A:
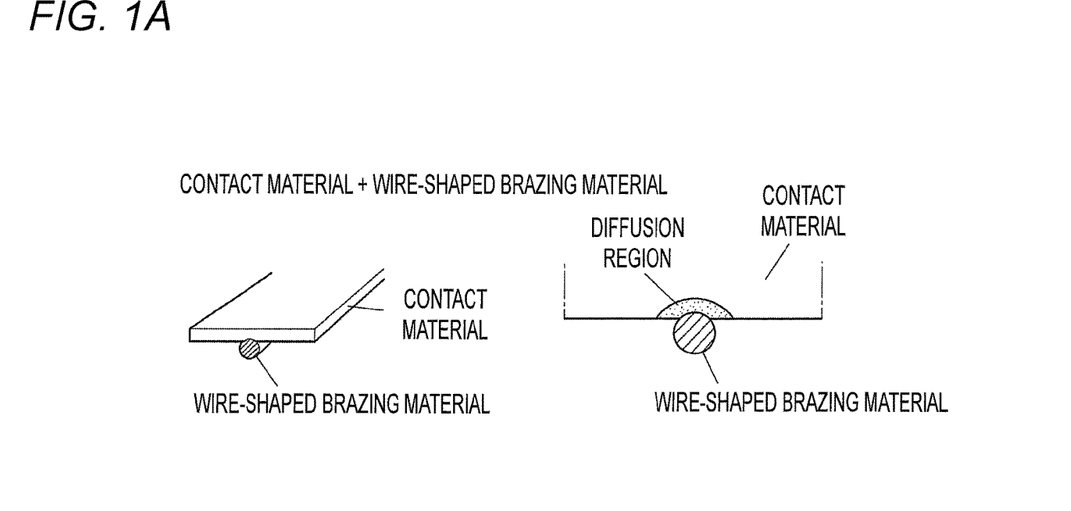
FIGS. 1A and 1B illustrate a cross-sectional shape for one example of a tape-shaped contact of the present invention.
Figure 1B:
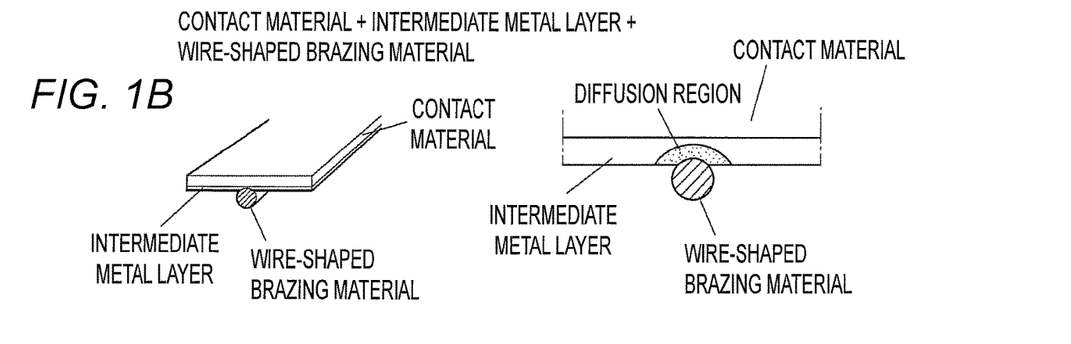

A chip-shaped contact component can be obtained by cutting the tape-shaped contact member of the present invention to a desired length. The cross-sectional shape of the tape-shaped contact member of the present invention is as shown in FIGS. 1A and 1B, and a projection including a brazing material is formed on a surface of the contact material (FIG. 1A). The chip-shaped contact component obtained from the tape-shaped contact member of the present invention can be bonded to a terminal etc. of an electrical contact by resistance welding, and the chip-shaped contact component is bonded to the terminal when the projection including a brazing material is melted.

In the tape-shaped contact member of the present invention, the amount (volume) of the brazing material is limited in comparison with a conventional contact member including a layered brazing material. Thus, in the present invention, protrusion of the molten brazing material can be effectively suppressed.

Comparison between the contact component of the present invention and a contact component including a welding material provided with a conventional projection shows that the contact component of the present invention does not contain a welding material, and therefore can contribute to height reduction corresponding to the thickness of the welding material. Further, since there is no welding material, excellent heat dissipation property is exhibited because, so that it is possible to reduce wear of the contact material.

Further, in the present invention, a moderate bonding area between the contact member and the terminal can be set. In the contact member of the present invention, the brazing material forming a projection and the contact material are bonded to each other while having a predetermined diffusion region. This means that in the present invention, the brazing material and the contact material are moderately integrated with each other. When resistance welding is performed in this state, the diffusion region on the periphery of the projection and the terminal can be firmly bonded to each other by resistance heat generated in the vicinity of the projection. In addition, in the present invention, the entire projection is formed of the brazing material, and wet-spreading of the brazing material occurs during bonding. Due to the influence of the diffusion region and the wet-spreading of the brazing material, the bonding area can be increased. On the other hand, a contact component, to which a welding material provided with a conventional projection, has a small bonding area because a range over which melting occurs during bonding is limited. The contact material can be firmly bonded to the terminal by the effect of increasing the bonding force and optimization of the bonding area in the invention of the present application. In addition, by increasing the bonding area, the heat dissipation effect is enhanced, so that the durability of the contact material that is apt to have a high temperature during operation can be improved.

The configuration of the contact member of the present invention will now be described. As described above, the tape-shaped contact material of the present invention has a tape-shaped contact member and a wire-shaped brazing material as basic components. The contact material is preferably an Ag-based contact material. The Ag-based contact material is a contact material formed of Ag or an Ag alloy. Ag is preferably pure Ag having a purity of 99% by mass or more. As the Ag alloy, a contact material including Ag containing at least one of Cu, Ni, Zn, Sn and In is preferable. Ag and the Ag alloy may contain inevitable impurities.

As a preferable contact material formed of an Ag alloy, an oxide dispersion strengthened contact material having a phase configuration with two or more phases is applied as well as a solid solution alloy such as an Ag—Cu alloy, or an alloy formed by powder metallurgy, such as an Ag—Ni alloy or an Ag—C alloy. The oxide dispersion strengthened contact material is widely used as a contact material for on-vehicle relays, and examples of the oxide dispersion strengthened contact material include Ag—$SnO_2$ alloys, Ag—$SnO_2$—$In_2O_3$ alloys, Ag—ZnO alloys and Ag—$SnO_2$—$Sn_2Bi_2O_7$—$In_2O_3$ alloys.

The dimensions of the tape-shaped contact material are not particularly limited. The width (i.e. a direction perpendicular to the longitudinal direction of the tape material) and the thickness of the tape-shaped contact material can be freely set according to a use purpose. For example, in an on-vehicle relay, a contact material having a width of 2.0 mm or more and a thickness of 0.4 mm or more is used.

The brazing material is preferably one formed of an Ag—Cu alloy from the viewpoint of a melting point and a bonding force. Examples of the brazing material formed of an Ag—Cu alloy include Ag—Cu alloys having an Ag content of 72% by mass or more and 85% by mass or less. It will be preferable if a brazing material including an Ag—Cu alloy further contains at least one of P, Sn, In, Ni, Si and Mn. Specific examples include Ag—P—Cu alloy solder (phosphorus copper solder) and Ag—Cu—Sn alloys (silver solder). These brazing materials are such ones as having a moderate melting point in bonding of the contact material. The above-described AgCu alloy that forms a brazing material may contain inevitable impurities.

For the brazing material to be applied in the present invention, it is preferable that the Zn content is controlled. Specifically, a brazing material having a Zn content of 20% by mass or less is preferable. Studies by the present inventors show that when a brazing material containing a relatively large amount of Zn in application of an Ag-based contact material, the brazing material may be easily peeled off because sufficient bonding strength is not obtained. Therefore, a brazing material having an appropriate melting point and containing Zn in an amount of more than 20% by mass is not preferable. In addition, the Zn content of the brazing material is more preferably 15% by mass or less. When the Zn content is more than 15% by mass and not more than 20% by mass, peeling may occur in the case of, for example, strongly twisting the contact member, and care is often necesssary in handling.

Figure 2:
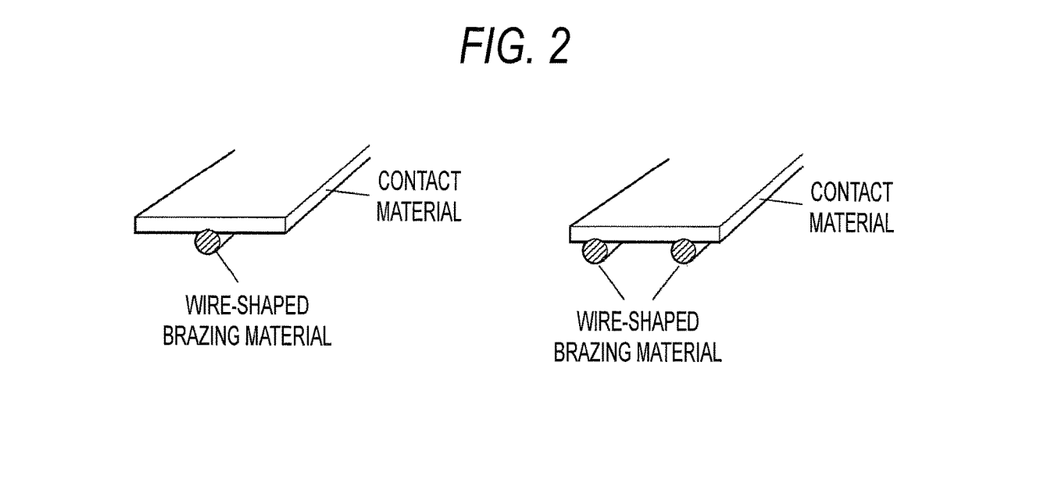
FIG. 2 illustrates a position at which a projection is formed in the tape-shaped contact of the present invention.

In the present invention, a wire-shaped brazing material is bonded to a tape-shaped contact material to obtain a contact member. At least one wire-shaped brazing material is necessary, and a plurality of wires (projections) may be bonded. As shown in FIG. 2, one wire-shaped brazing material can be bonded to the central portion of the contact material, or two wire-shaped brazing materials can be bonded in the vicinity of both end portions.

The wire diameter of the wire-shaped brazing material to be bonded is preferably about 0.01 times or more and 0.1 times or less of the width of the contact material. When a plurality of wires are bonded, it is preferable that the wires have the above-mentioned conditions as a whole.

Here, the tape-shaped contact of the present invention is based on a structure in which a wire-shaped brazing material is directly bonded to a tape-shaped contact material, but it is preferable that an intermediate metal layer for increasing bonding strength between the contact material and the brazing material is formed, the wire-shaped brazing material is bonded to the intermediate metal layer (FIG. 1B). When the intermediate metal layer is applied, the brazing material can be bonded to the contact material while an appropriate diffusion region is formed without excessively melting and deforming the wire-shaped brazing material. The bonded wire-shaped brazing material is firmly fixed. As the intermediate metal layer, it is preferable to apply an intermediate metal layer formed of a metal to which metal elements (Cu or Ag) from the brazing material are easily diffused. The constituent material of the intermediate metal layer is preferably a material containing at least one of Ag, Ni and Cu. Specifically, one of Ag (preferably pure Ag having a purity of 99% by mass or more), an Ag alloy such as an AgNi alloy (preferably an AgNi alloy containing 0.2% by mass or less of Ni and inevitable impurities) and Cu (preferably pure Cu having a purity of 99% by mass or more).

It is preferable for the intermediate metal layer to have a thickness of 0.02 mm or more and 0.2 mm or less. This is because the degree of dimensional freedom for the thickness of the contact member can be secured while bonding strength is secured. Even when the intermediate metal layer is applied, one or more wire-shaped brazing materials can be bonded to the intermediate metal layer as in FIG. 2.

In the present invention, a diffusion region is formed along an interface with the brazing material inside the contact material or inside the intermediate metal layer. The diffusion region is formed by diffusion of the constituent metal of the brazing material to the contact material or the intermediate metal layer. For example, when an Ag-based contact material is applied as a contact material, and a brazing material containing an Ag—Cu alloy (Ag—P—Cu alloy, Ag—Cu—Sn alloy or the like) is applied as a brazing material, Cu as a metal component of the brazing material is diffused to the diffusion region. As a result, a region containing Ag of the contact material and Cu of the brazing material is recognized as the diffusion region. In addition, the diffusion region is not required to have a constant composition, and often has a composition inclined to a distance from the brazing material interface. That is, the diffusion region is discriminated on the basis of whether or not a metal other than the constituent metals of the contact material, which corresponds to the constituent metal of the brazing material, is contained inside the contact material.

Figure 3:
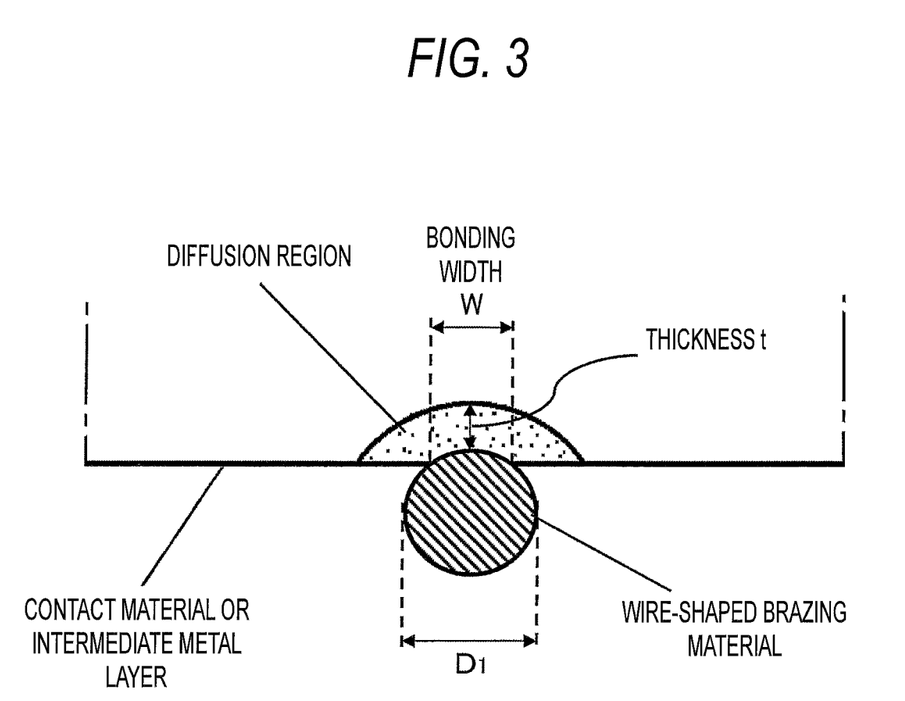
FIG. 3 illustrates a thickness (t) and a bonding width (W) of a diffusion region in the tape-shaped contact of the present invention.

The diffusion region formed as described above is required to have a thickness of 2 μm or more and 10 μm or less. When the thickness is less than 2 μm, integration of the contact material and the brazing material (projection) is insufficient, and which may cause a risk of a poor bonding in manufacturing an electrical contact. On the other hand, when the thickness is more than 10 μm, a change in composition of the brazing material will increase, and which may deteriorate the original performance of the brazing material. In addition, when the diffusion region has an excessively large thickness, there arises such a problem that thermal conductivity is deteriorated. In the present invention, the thickness of the diffusion region is strictly set to improve bondability and heat dissipation property in a chip-shaped contact component. The thickness of the diffusion region is a thickness (t) between a boundary line between the contact material or intermediate metal layer and the diffusion region and a boundary line between the wire-shaped brazing material and the diffusion region as shown in FIG. 3. For measurement of the thickness of the diffusion region, it is preferable that the thickness is measured at a plurality of points, and an average value of the measurements is applied. In addition, when a plurality of wire-shaped brazing materials are bonded to the contact material or intermediate metal layer as in FIG. 2, the diffusion regions of all the wire-shaped brazing materials are required to have a thickness of 2 μm or more and 10 μm or less.

In addition, regarding the state of a bonding interface between the wire-shaped brazing material and the contact material, the width of the bonding interface is more preferably larger than the bonding width of the brazing material by a certain amount or more. The bonding width is a direct distance between both end portions of the brazing material brought into contact with and bonded to the contact material as shown in FIG. 3. In the present invention, it is referable that the bonding width (W) of the brazing material and the diameter ($D_1$) of the brazing material satisfy the relationship of $W \geq 0.5 D_1$. When W is less than $0.5 D_1$, it may be impossible to sufficiently secure the bonding force between the brazing material and the contact material even when heat treatment is performed for formation of a diffusion layer. The tape-shaped contact member of the present invention is cut to an appropriate length according to a use purpose of the tape-shaped contact member, and used for manufacturing a contact component, and when the bonding force of the brazing material is insufficient, peeling may occur during cutting. Accordingly, when the brazing material is bonded to the contact material, it is preferable that the brazing material is moderately pressed to be bonded, so that the bonding width is secured, and the diffusion layer is then formed.

When the cross-section of the brazing material is substantially circular at the time of bonding the brazing material to the contact material, the diameter ($D_1$) of the brazing material can be obtained by measuring the diameter of the cross-section. In addition, when the wire-shaped brazing material is pressure-bonded to the contact member, the brazing material may have an elliptic or indefinite shape due to deformation of the brazing material. In this case, it is preferable that a circular shape is assumed on the basis of the circumference length of the cross-section of the brazing material, and the diameter of the circular shape is set to $D_1$.

The upper limit of the bonding width W of the brazing material is preferably equal to or less than $1.7D_1$. When W is $1.7D_1$ or less, a sufficient bonding force is secured. When w is more than $1.7D_1$, the brazing material (projection) is excessively collapsed, and may fail to effectively function in resistance welding.

When a plurality of wire-shaped brazing materials are bonded to the contact material or intermediate metal layer, it is preferable that the bonding width (W) of the brazing material and the diameter ($D_1$) of the brazing material satisfy the above-described relationship in all the wire-shaped brazing material bonding portions.

Next, a method for manufacturing the tape-shaped contact member of the present invention will be described. The tape-shaped contact member of the present invention can be manufactured by bonding a wire-shaped brazing material to a tape-shaped contact material, and then forming a diffusion region in the vicinity of a bonding interface of the wire-shaped brazing material. That is, the method includes the steps of: pressure-bonding at least one wire-shaped brazing material to a tape-shaped contact material; and forming a diffusion region by performing heating at a temperature equal to or higher than 500° C. and equal to or lower than the melting point of the brazing material.

In addition, in the present invention, an intermediate metal layer may be formed between the contact material and the brazing material. For manufacturing a contact member including an intermediate metal layer, a tape-shaped contact material and a tape-shaped intermediate metal layer are bonded to each other, and a wire-shaped brazing material is then pressure-bonded to the intermediate metal layer. Alternatively, the tape-shaped intermediate metal layer and the wire-shaped brazing material may be simultaneously pressure-bonded to the tape-shaped contact material. When a plurality of wire-shaped brazing materials are pressure-bonded, the wire-shaped brazing materials may be sequentially or simultaneously bonded.

In the method for manufacturing the tape-shaped contact member of the present invention, specific bonding methods for bonding the wire-shaped brazing material include pressure-bonding by a rolling roll (including a grooved roll). Here, when the wire-shaped brazing material is pressure-bonded to the contact material or intermediate metal layer, it is preferable that the wire-shaped brazing material is bonded by applying pressure until the bonding width W of the wire-shaped brazing material and the diameter $D_0$ of the wire-shaped brazing material satisfy the relationship of $W \geq 0.5D_0$. In addition, W is preferably equal to or less than $1.7D_0$. Application of pressure here can be appropriately adjusted according to the materials and dimensions of the contact material, the intermediate metal layer and the brazing material.

In heat treatment for forming the diffusion region after bonding of the brazing material, heating is performed at a temperature equal to or higher than 500° C. and equal to or lower than the melting point of the brazing material. When the temperature is lower than 500° C., a diffusion region having a desired thickness is not formed, and when the heat treatment is performed at a temperature higher than the melting point of the brazing material, there arises the problem that voids are generated, or the wire shape of the brazing material cannot be maintained. The heat treatment time is preferably 0.25 hours or more and 1.0 hour or less. The heat treatment atmosphere may be an air atmosphere, or an inert gas atmosphere or a reducing atmosphere.

The above-described tape-shaped contact member of the present invention is appropriately cut to obtain a chip-shaped contact component for manufacturing an electrical contact. The chip-shaped contact component may have a length appropriate to the dimensions of an electrical contact to be manufactured and a terminal to be bonded. The length of the tape-shaped contact member of the present invention is not limited. In addition, when the dimensions of the tape-shaped contact member are equalized with the size of the chip-shaped contact component in advance, the contact component can be obtained without cutting the tape-shaped contact member.

The chip-shaped contact component has at least one projection on the bonding surface to the terminal in a cross-sectional shape. The projection is abutted against the terminal to be bonded, and the contact component is fed with electricity and pressed to manufacture the electrical contact. The chip-shaped contact component of the present invention is useful for a switching electrical contact, specifically as a constituent material for relays and switches.

In the step of bonding the electrical contact from the chip-shaped contact component, the contact component is fed with electricity while being pressed to the terminal. As conditions here, it is preferable that the current is 2 kA to 10 kA, and the pressure is 2 kgf to 10 kgf. When the current value is less than 2 kA and the pressure is less than 2 kgf, bonding cannot be performed over a sufficient range. On the other hand, when the current value is more than 10 kA and the pressure is more than 10 kgf, a thermally influences portion unnecessarily widely extends, or material deformation occurs, so that a preferred contact structure cannot be formed.

Advantageous Effects of the Invention

As described above, the present invention allows a preferred chip-shaped contact component for manufacturing a switching electrical contact to be efficiently manufactured. The chip-shaped contact component is a contact component which hardly suffers from poor bonding, and is excellent in durability while being capable of adapting to height reduction. The present invention can contribute to efficient manufacturing of switching electrical contacts for switches, relays and the like. In particular, the contact component is useful when used for on-vehicle relays having a high capacity, and further useful when used for relays having a small size and a high capacity.

DESCRIPTION OF EMBODIMENTS

Hereinafter, preferred examples of the present invention will be described.

First Embodiment

In this embodiment, a tape-shaped contact member was manufactured by application of a tape-shaped oxide dispersive Ag-based alloy as a contact material and copper-based phosphorus copper solder as a wire-shaped brazing material for forming a projection.

In this embodiment, a plurality of contact members different in the number and wire diameter of wire-shaped brazing materials. Ag was applied as an intermediate metal layer.

Contact members in which a tape-shaped intermediate metal layer and one wire-shaped brazing material (wire diameter: 0.16 mm or 0.26 mm) are bonded to a tape-shaped contact material, and thus one projection is formed (Examples 1 and 2 and Comparative Examples 1 and 2)

Contact members in which a tape-shaped intermediate metal layer and two wire-shaped brazing materials (wire diameter: 0.16 mm or 0.26 mm) are bonded to a tape-shaped contact material, and thus two projections are formed (Examples 3, 4 and 5)

Figure 4:
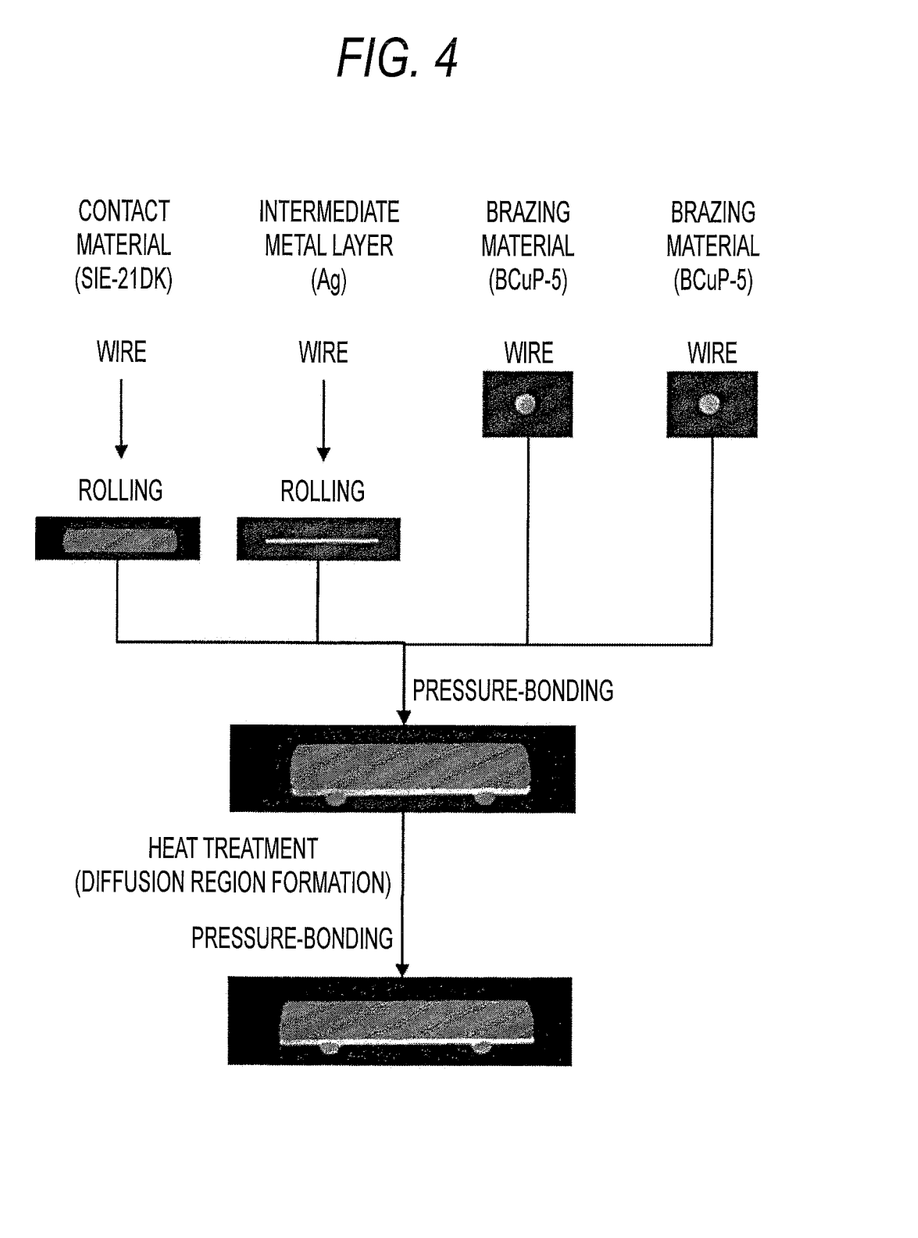
FIG. 4 illustrates a process for manufacturing a tape-shaped contact in an embodiment.

FIG. 4 shows a process for manufacturing a contact member in which a tape-shaped intermediate metal layer and two wire-shaped brazing materials are bonded to a tape-shaped contact material (Examples 3, 4 and 5). A process for manufacturing various tape-shaped contact members in this embodiment will be described with reference to this drawing.

As the contact material, a tape member of an oxide dispersive Ag-based alloy (parent phase: Ag (85.5 wt %), dispersion phase: $SnO_2+In_2O_3$, trade name: SIE-21 DK (manufactured by Tanaka Kikinzoku Kogyo)) was prepared. In addition, a tape member of pure Ag (purity: 99.9 wt %) was prepared as the intermediate metal layer in FIG. 4. These tape members were superposed on each other, and pressure was applied to manufacture a tape member having two-layer structure of contact material/intermediate metal layer (dimensions=width: 2.48 mm, contact material thickness: 0.315 mm, intermediate metal layer thickness: 0.05 mm).

For the two-layer tape-shaped contact material prepared as described above, a wire-shaped brazing material of phosphorus copper solder (Ag (15 wt %)-P (5 wt %)-Cu (balance) (BCuP-5)) was prepared as a brazing material. In this embodiment, two wire-shaped brazing materials having different wire diameters (0.16 mm and 0.26 mm) were prepared, and a contact member was manufactured with each of the brazing materials. These wire-shaped brazing materials were each positioned on and press-bonded to a surface of a tape-shaped contact material.

The bonded tape member and wire-shaped brazing material were subjected to heat treatment in an atmospheric furnace to form a diffusion region, so that a tape-shaped contact member was manufactured. As conditions for the heat treatment, the heat treatment was performed at 600° C. for 0.5 hours (Examples 1 to 4), at 600° C. for 1 hour (Example 5), at 300° C. for 0.5 hours (Comparative Example 1) and at 700° C. for 0.5 hours (Comparative Example 2).

Figure 5:
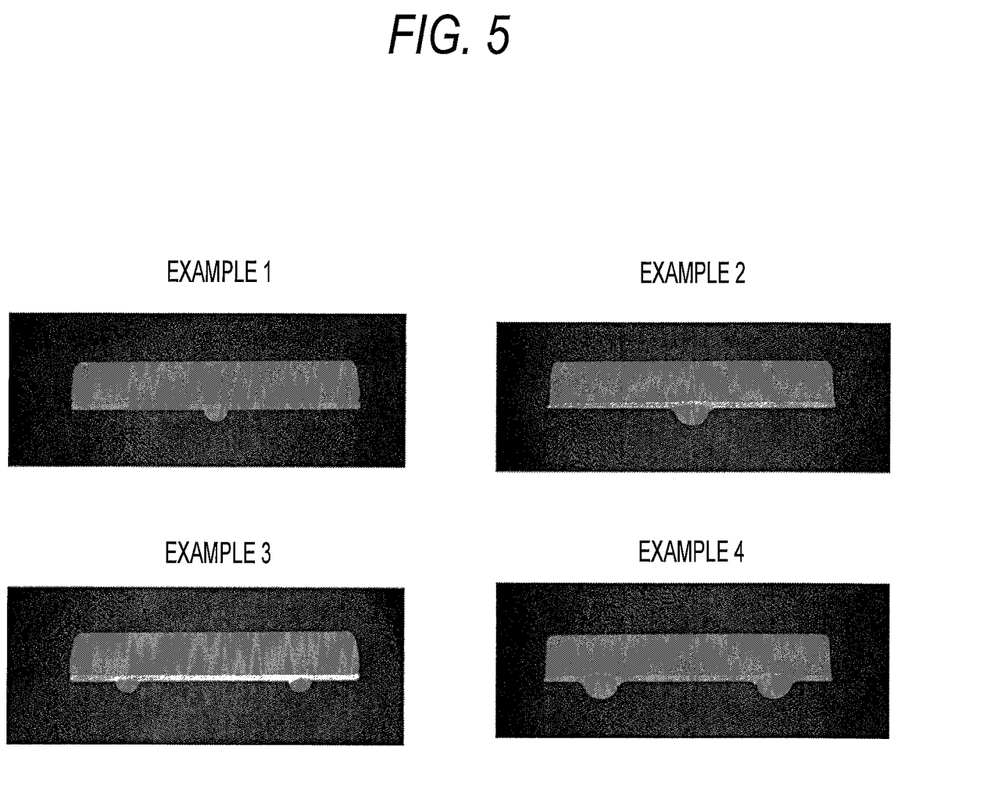
FIG. 5 shows photographs of cross-sections of tape-shaped contact members manufactured in an embodiment.

FIG. 5 shows photographs of cross-sections of tape-shaped contact members in Examples 1 to 4. In these examples, the contact materials have the same width and thickness, and the intermediate metal layers have the same width and thickness. In all of these examples, the cross-sectional shape of the wire-shaped brazing material was deformed by pressure-bonding of the brazing material to the contact material, and turned into a circular shape collapsed on the upper side (at the interface with the contact material).

In this embodiment, a photograph of a cross-section as in FIG. 5 was taken in each example, and the bonding width (W) and the diameter ($D_1$) of the wire-shaped brazing material were measured on the basis of the photograph of the cross-section. For example, in the contact member in FIG. 5, the bonding width (W) was 0.2 mm (Example 1 and example using a wire having a diameter of 0.16 mm) and 0.3 mm (Examples 2 and 4 using a wire having a diameter of 0.26 mm). In addition, in this embodiment, the length of the outer periphery of the cross-section of the brazing material was equal to the length of the outer periphery of the wire-shaped brazing material before pressure-bonding, and therefore $D_1$ was equal to $D_0$. Accordingly, in Examples 1 and 3, the bonding width W was $1.25D_1$. In Examples 2 and 4, the bonding width W was $1.15D_1$. Similarly, the bonding width (W) and the diameter ($D_1$) of the brazing material in each of other examples and comparative examples were measured.

Figure 6:
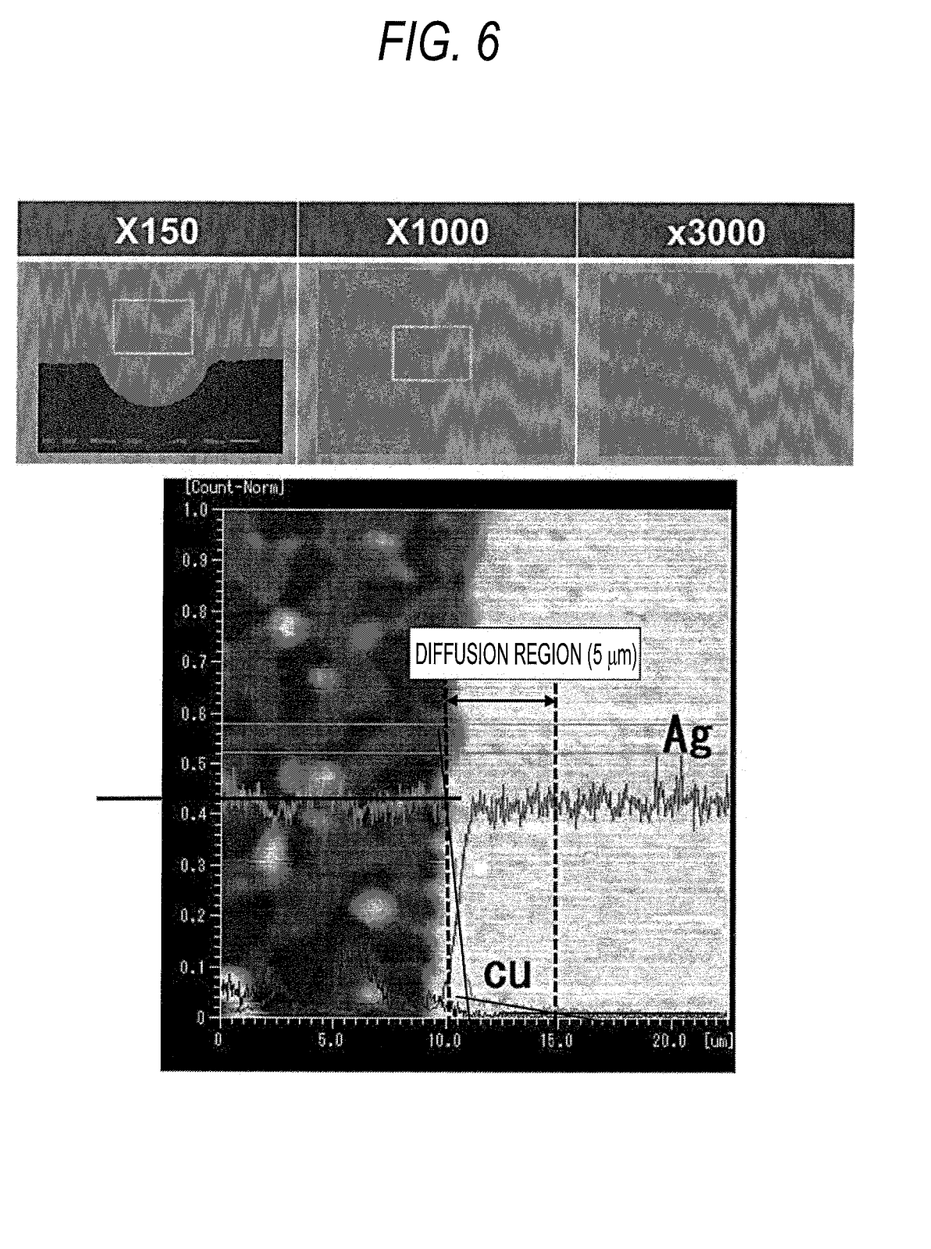
FIG. 6 shows results of EPMA analysis in the vicinity of a brazing material (projection) of a tape-shaped contact in Example 1.

The diffusion regions of the tape-shaped contact members in examples and comparative examples were examined. FIG. 6 shows results of analysis by EPMA (electron beam microprobe) in the vicinity of the brazing material of the contact member in Example 1. In this embodiment, the intermediate metal layer (silver layer) was applied, and a diffusion region in which Cu as a component of the brazing material was diffused was formed inside the silver layer. The content of Cu in the diffusion region was inclined. The thickness of the diffusion region was measured on the basis of the line of the Cu concentration in the EPMA analysis in FIG. 6. In this measurement, a center line was drawn to a Cu line inside the brazing material, and a tangent line to an inclined Cu line inside the diffusion region (line extending rightward and downward from the line inside the brazing material) was then drawn. A part at which these lines crossed each other was defined as one end (start point) of the diffusion region. A center line was drawn to a line of Cu in a region free from Cu (region having a Cu intensity close to zero) inside the intermediate metal layer, and a part at which this line crossed a tangent line to a Cu line extending leftward and upward to the inside of the diffusion region was defined as the other end (end point). The thickness of the diffusion region was measured after the start point and the end point of the diffusion region were defined as described above, the results showed that a diffusion region of 5.0 μm was formed. In this embodiment, the thickness of the diffusion region in each of other examples and comparative examples was measured in the same manner as in Example 1.

The results of measuring the bonding width (W), the diameter ($D_1$) of the brazing material and the thickness of the diffusion region in examples and comparative examples are shown in Table 1. For contact members in which two projections are formed, average values are shown in Table 1.

TABLE 1

| | Contact material | Intermediate metal layer | Wire-shaped brazing material | | | Heat treatment | | W (mm) | $D_1$ (mm) | $W/D_1$ | Thickness of diffusion region (μm) |
|---|---|---|---|---|---|---|---|---|---|---|---|
| | | | Type | $D_0$ (mm) | Number | Temperature (° C.) | Time (hr) | | | | |
| Example 1 | Ag/ | Ag | Ag—Cu—P | 0.16 | 1 | 600 | 0.5 | 0.20 | 0.16 | 1.25 | 5.0 |
| Example 2 | (SnO$_2$ + In$_2$O$_3$) | | | 0.26 | | | | 0.20 | 0.26 | 0.77 | 6.0 |
| Example 3 | | | | 0.16 | 2 | | | 0.30 | 0.16 | 1.25 | 4.0 |
| Example 4 | | | | 0.26 | | | | 0.30 | 0.26 | 1.15 | 5.0 |
| Example 5 | | | | 0.26 | | | 1 | 0.35 | 0.26 | 1.35 | 8.0 |
| Comparative Example 1 | | Ag | | 0.26 | 1 | 300 | 0.5 | 0.11 | 0.26 | 0.42 | 1.2 |
| Comparative Example 2 | | | | 0.16 | | 700 | 1 | 0.24 | 0.16 | 1.50 | 11.0 |

Next, the tape-shaped contact member in each example was cut to manufacture a chip-shaped contact component, and the durability of the chip-shaped contact component bonded to a terminal was evaluated. In this test, the chip-shaped contact component was bonded to a 0.15% Cu—Sn plate cut to a length of 2.48 mm and used to simulate a terminal of an electrical contact. The contact component was set in a relay (DC 14 V, 30 A, and a durability test was conducted.

In the durability test, the switching frequency was set to ON for 0.3 seconds and OFF for 4.5 seconds, and switching was performed 120,000 times, followed by examining whether or not deposition occurred. In addition, the cross-section of the terminal after the test was observed to examine the bonding state of the contact component and the consumption of the contact material. The contact component was rated acceptable "Good" when the contact material was confirmed to remain and there was no change in contact state between the contact component and the terminal in the observation of the cross-section. On the other hand, the contact component was rated unacceptable "Bad" when the contact material was noticeably worn, or peeling occurred at the bonding interface between the contact component and the terminal.

The durability test in this embodiment was also conducted for a contact component having a welding material provided with a projection of a conventional art. The conventional example is a contact member in which the same contact material as in this embodiment is bonded to a welding material formed of a Cu-30% Ni alloy and integrated with a projection as in FIG. 10. In the conventional example used in this embodiment, a welding material and a contact material are bonded to each other with a pure Ag intermediate metal interposed between the welding material and the contact material. Results of durability tests conducted for examples, comparative examples and the conventional example are shown in Table 2.

TABLE 2

| | Contact material | Intermediate metal layer | Brazing material | | | W (mm) | $D_1$ (mm) | $W/D_1$ | Thickness of diffusion region (μm) | Result of durability test |
|---|---|---|---|---|---|---|---|---|---|---|
| | | | Type | $D_0$ (mm) | Number | | | | | |
| Example 1 | Ag/ | Ag | Ag—Cu—P | 0.16 | 1 | 0.20 | 0.16 | 1.25 | 5.0 | "Good" |
| Example 2 | (SnO$_2$ + In$_2$O$_3$) | | | 0.26 | | 0.20 | 0.26 | 0.77 | 6.0 | "Good" |
| Example 3 | | | | 0.16 | 2 | 0.30 | 0.16 | 1.25 | 4.0 | "Good" |
| Example 4 | | | | 0.26 | | 0.30 | 0.26 | 1.15 | 5.0 | "Good" |
| Example 5 | | | | 0.26 | | 0.35 | 0.26 | 1.35 | 8.0 | "Good" |
| Comparative Example 1 | | Ag | | 0.26 | 1 | 0.11 | 0.26 | 0.42 | 1.2 | "Bad"[*1] |
| Comparative Example 2 | | | | 0.16 | | 0.24 | 0.16 | 1.50 | 11.0 | "Bad"[*1] |
| Conventional Example | | Ag | Ag—Ni | — | — | — | — | — | — | "Bad"[*2] |

[*1]Unacceptable because contact member is peeled off
[*2]Unacceptable because the wear amount of contact member is excessively large In the durability test in this embodiment, switching operation was performed 120,000 times, and deposition did not occur in any of the contact component. However, observation of the cross-section in the vicinity of the contact member after the test showed that there was a difference between the test results in examples and the test results of comparative examples and the conventional example.

Figure 7:
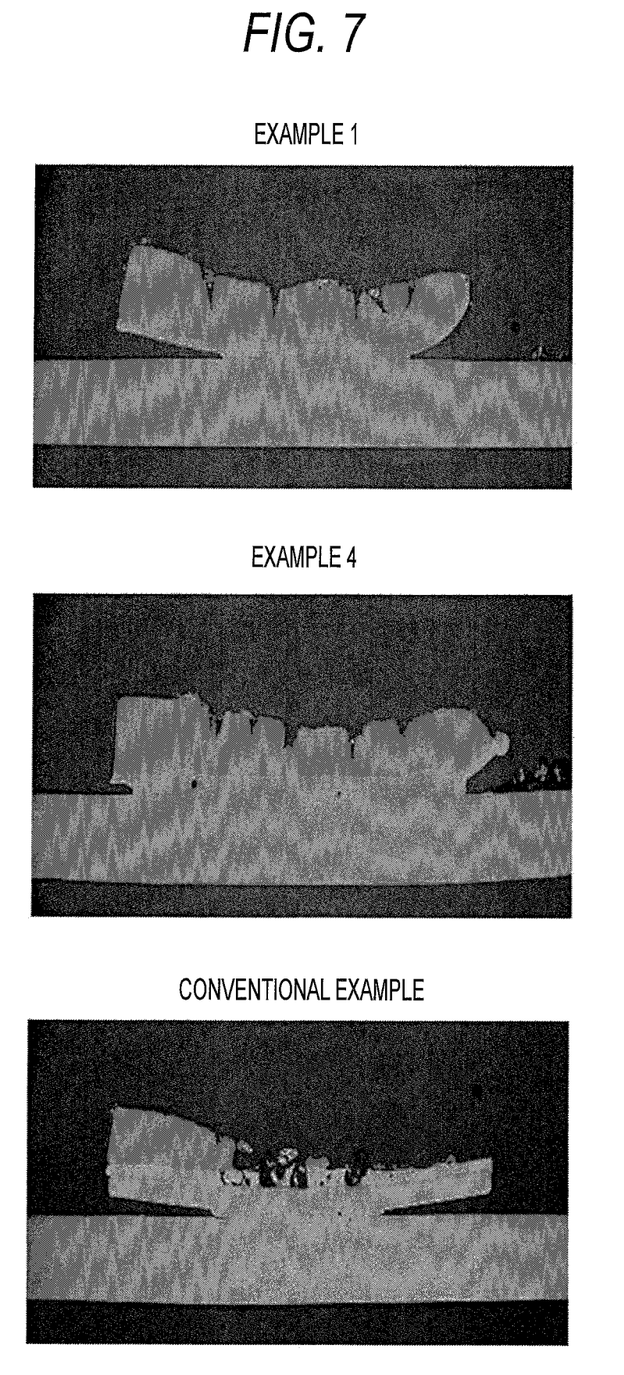
FIG. 7 shows photographs of cross-sections of terminals after durability tests in Examples 1 and 4 and a conventional example.

FIG. 7 shows photographs of cross-sections of terminals after durability tests in Examples 1 and 4 and a conventional example. FIG. 7 indicates that in the contact component in the conventional example, the contact material was mostly worn, and a base (Ag forming the intermediate metal layer) was exposed. Thus, the contact component in the conventional example was unacceptable for the result of the durability test. This result suggests that when the contact member in the conventional example is applied, a long-term load causes a failure. On the other hand, the contact components in Examples 1 and 4 were rated acceptable because the contact material remained sufficiently, and the bonding state between the contact member and the terminal was favorable. The same durability test results as in Examples 1 and 4 were obtained for the contact components in Examples 2 to 5.

A difference in consumption of the contact material as shown from comparison of examples with comparative examples is ascribable to a difference in bonding area between the contact member and the terminal. As described above, in the present invention, the bonding area can be increased as compared to the contact member of the conventional example in which a welding member provided with a projection is applied. It is considered that due to the increase in bonding area, the heat dissipation amount to the terminal from the contact material increased, resulting in reduction of a load on the contact material. It can be said that wear of the contact material was suppressed as a result of the load reduction.

On the other hand, the reason why the contact members in Comparative Examples 1 and 2 were rated unacceptable in durability test results is that peeling was observed at the bonding interface between the contact member and the terminal in observation of the cross-section. In these comparative examples, the thickness of the diffusion region was less than 2 μm (Comparative Example 1) or more than 10 μm (Comparative Example 2). The insufficient thickness of the diffusion region may be a direct factor of peeling due to poor bonding of the contact member. In addition, it is considered that when the thickness of the diffusion region was excessively large, a variation in composition of the brazing material increased, leading to deterioration of bondability of the brazing material. Thus, the excess or insufficient thickness of the diffusion region may be a factor of peeling of the contact member. In this durability test, the contact member was not peeled off and scattered during the test, but it was shown to be necessary that the diffusion region have an appropriate thickness because peeling may occur during use depending on a load on the electrical contact.

The thickness of the diffusion region after the durability test was measured for each of the contact members in Examples 1 and 2, and the result showed that the thickness was substantially identical to that before the durability test (state after manufacturing). The contact member may undergo thermal influences associated with heat treatment in bonding of the contact member to the terminal during manufacturing of the electrical contact, heat generation resulting from a load during drive of the electrical contact, and so on. The contact component of the present invention is considered to suffer from little change in configuration due to these thermal influences. Accordingly, the contact component of the present invention is supposed to suffer from little change in configuration, and stably act even when incorporated in the terminal of the electrical contact, etc.

Second Embodiment

In this embodiment, a plurality of wire-shaped brazing materials were bonded to a tape-shaped contact materials to manufacture a tape-shaped contact member, and the bonding force of the tape-shaped contact member was examined. Here, an Ag—Cu alloy brazing material having an Ag—Cu alloy as a base and containing some additive metals was formed into a wire (wire diameter: 0.16 mm), bonded to a tape member of the same contact material as in Example 3 in the first embodiment and a tape member of an Ag intermediate metal layer, and subjected to heat treatment to manufacture a contact member (Examples 6 to 10 and Comparative Examples 3 to 5). The number and dimensions of projections were the same as in Example 3. In the contact member of each example which was manufactured in this embodiment, the thickness of a diffusion region at a brazing material interface was confirmed to fall within a range of 2 μm or more and 10 μm or less.

For the manufactured tape-shaped contact member, a twisting test was conducted for examining the bonding force of the brazing material (projection). In the twisting test, a 300 mm tape-shaped contact member was prepared, and twisting was performed in 4 seconds in which the contact member was rotated to the right 24 times, and rotated to the left 24 times with the twisting angle set to 360° (one rotation). After the twisting, the appearance was observed to examine whether or not the brazing material (projection) was peeled off. Results of the test are shown in

TABLE 3

| | Brazing material components (wt %) | | | | | | | | | Twisting test result |
|---|---|---|---|---|---|---|---|---|---|---|
| | Ag | Cu | P | Sn | Zn | In | Ni | Mn | Si | |
| Example 3 | 15 | 80 | 5 | — | — | — | — | — | — | "Good" |
| Example 6 | 67 | 29 | — | 4 | — | — | — | — | — | "Good" |
| Example 7 | 72 | 28 | — | — | — | — | — | — | — | "Good" |
| Example 8 | 85 | 15 | — | — | — | — | — | — | — | "Good" |
| Example 9 | 50 | 34 | — | — | 16 | — | — | — | — | "Fair" |
| Example 10 | 56 | 22 | — | 5 | 17 | — | — | — | — | "Fair" |
| Comparative Example 3 | 45 | 26 | — | — | 21 | 5 | 3 | — | — | "Bad" |
| Comparative Example 4 | 5 | 55 | — | — | 39.8 | — | — | — | 0.2 | "Bad" |
| Comparative Example 5 | 49 | 16 | — | — | 23 | — | 4.5 | 7.5 | — | "Bad" |

"Good": peeling is not observed at any part
"Fair": peeling partially occurs (less than half the sample length)
"Bad": peeling occurs (half or more to whole of the sample length)

It can be said from the twisting test that when an Ag—Cu alloy (Examples 7 and 8) or an alloy with P or Sn added to an Ag—Cu alloy (Examples 3 and 6) is bonded, a favorable bonding force is obtained. The tape-shaped contact member free from Zn may have no risk of peeling of a brazing material even at the time of cutting the contact member to an arbitrary length according to a use purpose. On the other hand, Examples 11 and 12 and Comparative Examples 3 to 5 are examples in which a brazing material formed of an Ag—Cu alloy containing Zn is applied. In Comparative Examples 3 to 5, an Ag—Cu alloy containing 20% by mass or more of Zn is used, and the brazing material is peeled off in the twisting test, so that caution is needed for handling in cutting etc. In addition, in Examples 9 and 10, an Ag—Cu alloy containing Zn in an amount of more than 15% by mass, and peeling partially occurred. For the brazing material having a Zn content of more than 15% and not more than 20%, it is considered that by handling the brazing material with caution paid to occurrence of peeling, a contact component having contact performance can be manufactured without causing poor bonding.

INDUSTRIAL APPLICABILITY

According to the present invention, a chip-shaped contact component to be used as a constituent material for a switching electrical contact can be efficiently manufactured. The contact component does not require a welding member unlike a contact component provided with a welding material with a projection, which is a conventional art. Thus, the height of the contact member can be reduced. In addition, the contact member is excellent in bondability and durability. The present invention can suitably contribute to manufacturing of switching electrical contacts for switches, relays and the like. Particularly, in an on-vehicle relay, downsizing is required, and therefore the present invention is suitable for this use purpose.

The invention claimed is:

1. A tape-shaped contact member comprising a tape-shaped contact material, wherein
at least one wire-shaped brazing material is bonded to the tape-shaped contact material,
at least one projection including the brazing material and protruding from a surface of the contact material is formed in a cross-sectional shape,
a diffusion region containing a metal component forming the brazing material is formed along an interface with the brazing material inside the contact material, and
the diffusion region has a thickness of 2 82 m or more and 10 μm or less.

2. A tape-shaped contact member comprising a tape-shaped contact material, wherein
a tape-shaped intermediate metal layer and at least one wire-shaped brazing material is bonded to the tape-shaped contact material,
at least one projection protruding from a surface of the contact material is formed from the brazing material in a cross-sectional shape,
a diffusion region containing a metal component forming the brazing material is formed along an interface with the brazing material on the intermediate metal layer, and
the diffusion region has a thickness of 2 μm or more and 10 μm or less.

3. The tape-shaped contact member according to claim 1, wherein a bonding width W between the tape-shaped contact material and the wire-shaped brazing material and a diameter ($D_1$) of the wire-shaped brazing material satisfy a relationship of $W \geq 0.5 D_1$.

4. The tape-shaped contact member according to claim 1, wherein the brazing material incudes an Ag-Cu alloy.

5. The tape-shaped contact member according to claim 4, wherein the brazing material comprises an Ag-Cu alloy containing at least one of P, Sn, In, Ni, Si and Mn.

6. The tape-shaped contact member according to claim 1, wherein the contact material is an Ag-based contact material.

7. The tape-shaped contact member according to claim 6, wherein the contact material is an Ag-based contact material containing a metal of at least one of Cu, Ni, Zn, Sn and In.

8. The tape-shaped contact member according to claim 1, wherein the intermediate metal layer contains a metal of at least one of Ag, Ni and Cu.

9. A method for manufacturing the tape-shaped contact member according to claim 1, wherein
the method comprises the steps of: pressure-bonding at least one wire-shaped brazing material to a tape-shaped contact material; and
forming a diffusion region by performing heating at a temperature equal to or higher than 500° C. and equal to or lower than the melting point of the brazing material.

10. The method for manufacturing the tape-shaped contact member according to claim 9, wherein the tape-shaped contact material and a tape-shaped intermediate metal layer are bonded to each other, and at least one wire-shaped brazing material is then pressure-bonded to the tape-shaped intermediate metal layer.

11. The method for manufacturing the tape-shaped contact member according to claim 9, wherein the tape-shaped intermediate metal layer and at least one wire-shaped brazing material are pressure-bonded to the tape-shaped contact material.

12. The method for manufacturing the tape-shaped contact member according to claim 9, wherein when the wire-shaped brazing material is pressure-bonded to the tape-shaped contact material or tape-shaped intermediate metal layer, the wire-shaped brazing material is bonded by applying pressure until the bonding width W of the wire-shaped brazing material and the diameter $D_0$ of the wire-shaped brazing material satisfy a relationship of $W \geq 0.5 D_0$.

13. A chip-shaped contact component obtained by cutting the tape-shaped contact member according to claim 1.

14. A method for manufacturing an electrical contact by use of the chip-shaped contact component as defined in claim 13, the method comprising the step of bonding the chip-shaped contact component to a terminal of the electrical contact, wherein
in the bonding step, the chip-shaped contact component is pressed to the terminal, and simultaneously fed with electricity to melt the brazing material of the contact component, so that the contact component is bonded to the terminal.

15. A relay comprising the chip-shaped contact component as defined in claim 13.

16. The tape-shaped contact member according to claim 2, wherein a bonding width W between the tape-shaped contact material and the wire-shaped brazing material and a diameter ($D_1$) of the wire-shaped brazing material satisfy a relationship of $W \geq 0.5 D_1$.

17. The tape-shaped contact member according to claim 2, wherein the brazing material incudes an Ag-Cu alloy.

18. The tape-shaped contact member according to claim 2, wherein the contact material is an Ag-based contact material.

19. The tape-shaped contact member according to claim 2, wherein the intermediate metal layer contains a metal of at least one of Ag, Ni and Cu.

20. A chip-shaped contact component obtained by cutting the tape-shaped contact member according to claim 2.

* * * * *

UNITED STATES PATENT AND TRADEMARK OFFICE
CERTIFICATE OF CORRECTION

| | | |
|---|---|---|
| PATENT NO. | : 11,329,405 B2 | Page 1 of 1 |
| APPLICATION NO. | : 16/346820 | |
| DATED | : May 10, 2022 | |
| INVENTOR(S) | : Hiroshi Matsuo et al. | |

It is certified that error appears in the above-identified patent and that said Letters Patent is hereby corrected as shown below:

In the Claims

Claim 1, Column 15, Line 12:
Please delete:
"the diffusion region has a thickness of 2 82 m or more and"
Please replace with:
the diffusion region has a thickness of 2 μm or more and Signed and Sealed this
Twenty-fifth Day of October, 2022

Katherine Kelly Vidal
*Director of the United States Patent and Trademark Office*